(12) United States Patent
Tong et al.

(10) Patent No.: US 11,200,653 B2
(45) Date of Patent: Dec. 14, 2021

(54) LOCAL HISTOGRAM MATCHING WITH GLOBAL REGULARIZATION AND MOTION EXCLUSION FOR MULTI-EXPOSURE IMAGE FUSION

(71) Applicant: Samsung Electronics Co., Ltd., Suwon-si (KR)

(72) Inventors: Zhen Tong, Allen, TX (US); John W. Glotzbach, Allen, TX (US); Ruiwen Zhen, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

(21) Appl. No.: 16/707,652

(22) Filed: Dec. 9, 2019

(65) Prior Publication Data

US 2021/0042897 A1 Feb. 11, 2021

Related U.S. Application Data

(60) Provisional application No. 62/883,417, filed on Aug. 6, 2019.

(51) Int. Cl.
*G06T 5/50* (2006.01)
*G06T 5/40* (2006.01)

(52) U.S. Cl.
CPC ............... *G06T 5/50* (2013.01); *G06T 5/40* (2013.01); *G06T 2207/20221* (2013.01)

(58) Field of Classification Search
CPC ... G06T 5/50; G06T 5/40; G06T 2207/10016; G06T 2207/20201; G06T 2207/10144; G06T 2207/20208; H04N 5/2355
See application file for complete search history.

(56) References Cited

U.S. PATENT DOCUMENTS

| | | |
|---|---|---|
| 2007/0230788 A1 | 10/2007 | Lei |
| 2009/0115858 A1 | 5/2009 | Lee |
| 2010/0231738 A1* | 9/2010 | Border ................. H04N 5/772 348/222.1 |

(Continued)

FOREIGN PATENT DOCUMENTS

KR    10-2009-0045585 A    5/2009

OTHER PUBLICATIONS

Zhang et al (Motion-free exposure fusion based on inter-consistency and intra-consistency) Information Science 376 (2017) 190-201 (Year: 2017).*

(Continued)

*Primary Examiner* — Vikkram Bali

(57) ABSTRACT

A method includes obtaining, using at least one sensor of an electronic device, multiple image frames of a scene. The multiple image frames include a first image frame and a second image frame captured using different exposures. The method also includes excluding, using at least one processor of the electronic device, pixels in the first and second image frames based on a coarse motion map. The method further includes generating, using the at least one processor, multiple local histogram match maps based on different portions of the first and second image frames. In addition, the method includes generating, using the at least one processor, an image of the scene using the local histogram match maps.

21 Claims, 8 Drawing Sheets

(56) References Cited

U.S. PATENT DOCUMENTS

| | | | |
|---|---|---|---|
| 2011/0211732 A1* | 9/2011 | Rapaport | H04N 5/232 382/107 |
| 2011/0310970 A1 | 12/2011 | Lee et al. | |
| 2013/0070965 A1* | 3/2013 | Jang | H04N 5/2355 382/103 |
| 2013/0162855 A1* | 6/2013 | Kannermark | H04N 5/2355 348/222.1 |
| 2014/0161323 A1* | 6/2014 | Livyatan | G06T 3/0093 382/107 |
| 2014/0347521 A1 | 11/2014 | Hasinoff et al. | |
| 2015/0350513 A1* | 12/2015 | Zhang | G06K 9/4661 348/362 |
| 2016/0035073 A1 | 2/2016 | Park | |
| 2016/0212355 A1* | 7/2016 | Pouli | G06T 5/007 |
| 2017/0359498 A1* | 12/2017 | Benchemsi | H04N 5/2355 |

OTHER PUBLICATIONS

Shen, "Image registration by local histogram matching", Pattern Recognition, vol. 40, No. 4, Apr. 2007, pp. 1161-1172.

McGuire et al., "Local Histogram Matching for Efficient Optical Flow Computation Applied to Velocity Estimation on Pocket Drones", 2016 IEEE International Conference on Robotics and Automation (ICRA), May 2016, 6 pages.

Anirudth et al., "Robust Photometric Alignment for Asymmetric Camera System", 2018 IEEE International Conference on Consumer Electronics (ICCE), Jan. 2018, 4 pages.

International Search Report and Written Opinion of the International Searching Authority in connection with International Patent Application No. PCT/KR2020/010298 dated Nov. 11, 2020, 9 pages.

* cited by examiner

LOCAL HISTOGRAM MATCHING WITH GLOBAL REGULARIZATION AND MOTION EXCLUSION FOR MULTI-EXPOSURE IMAGE FUSION

CROSS-REFERENCE TO RELATED APPLICATION AND PRIORITY CLAIM

This application claims priority under 35 U.S.C. § 119(e) to U.S. Provisional Patent Application No. 62/883,417 filed on Aug. 6, 2019. This provisional application is hereby incorporated by reference in its entirety.

TECHNICAL FIELD

This disclosure relates generally to image capturing systems. More specifically, this disclosure relates to local histogram matching with global regularization and motion exclusion for multi-exposure image fusion.

BACKGROUND

Multi-frame blending algorithms are used in various applications to "fuse" or combine multiple image frames of a scene in order to produce a final image of the scene. For example, multiple image frames can be fused to perform high dynamic range (HDR) imaging or to perform motion blur reduction (MBR). In some applications, the image frames being fused are captured using different exposure settings, such as different ISO settings and/or different exposure times. Unfortunately, image frames captured using different exposure settings often have different brightness levels and often capture different amounts of motion within a scene. As a result, it is typically difficult to fuse image frames that are captured using different exposure settings.

SUMMARY

This disclosure provides local histogram matching with global regularization and motion exclusion for multi-exposure image fusion.

In a first embodiment, a method includes obtaining, using at least one sensor of an electronic device, multiple image frames of a scene. The multiple image frames include a first image frame and a second image frame captured using different exposures. The method also includes excluding, using at least one processor of the electronic device, pixels in the first and second image frames based on a coarse motion map. The method further includes generating, using the at least one processor, multiple local histogram match maps based on different portions of the first and second image frames. In addition, the method includes generating, using the at least one processor, an image of the scene using the local histogram match maps.

In a second embodiment, an electronic device includes at least one image sensor and at least one processor operatively connected to the at least one image sensor. The at least one processor is configured to obtain multiple image frames of a scene from the at least one image sensor. The multiple image frames include a first image frame and a second image frame captured using different exposures. The at least one processor is also configured to exclude pixels in the first and second image frames based on a coarse motion map. The at least one processor is further configured to generate multiple local histogram match maps based on different portions of the first and second image frames. In addition, the at least one processor is configured to generate an image of the scene using the local histogram match maps.

In a third embodiment, a non-transitory machine-readable medium contains instructions that when executed cause at least one processor of an electronic device to obtain, using at least one sensor of the electronic device, multiple image frames of a scene. The multiple image frames include a first image frame and a second image frame captured using different exposures. The medium also contains instructions that when executed cause the at least one processor to exclude pixels in the first and second image frames based on a coarse motion map. The medium further contains instructions that when executed cause the at least one processor to generate multiple local histogram match maps based on different portions of the first and second image frames. In addition, the medium contains instructions that when executed cause the at least one processor to generate an image of the scene using the local histogram match maps.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
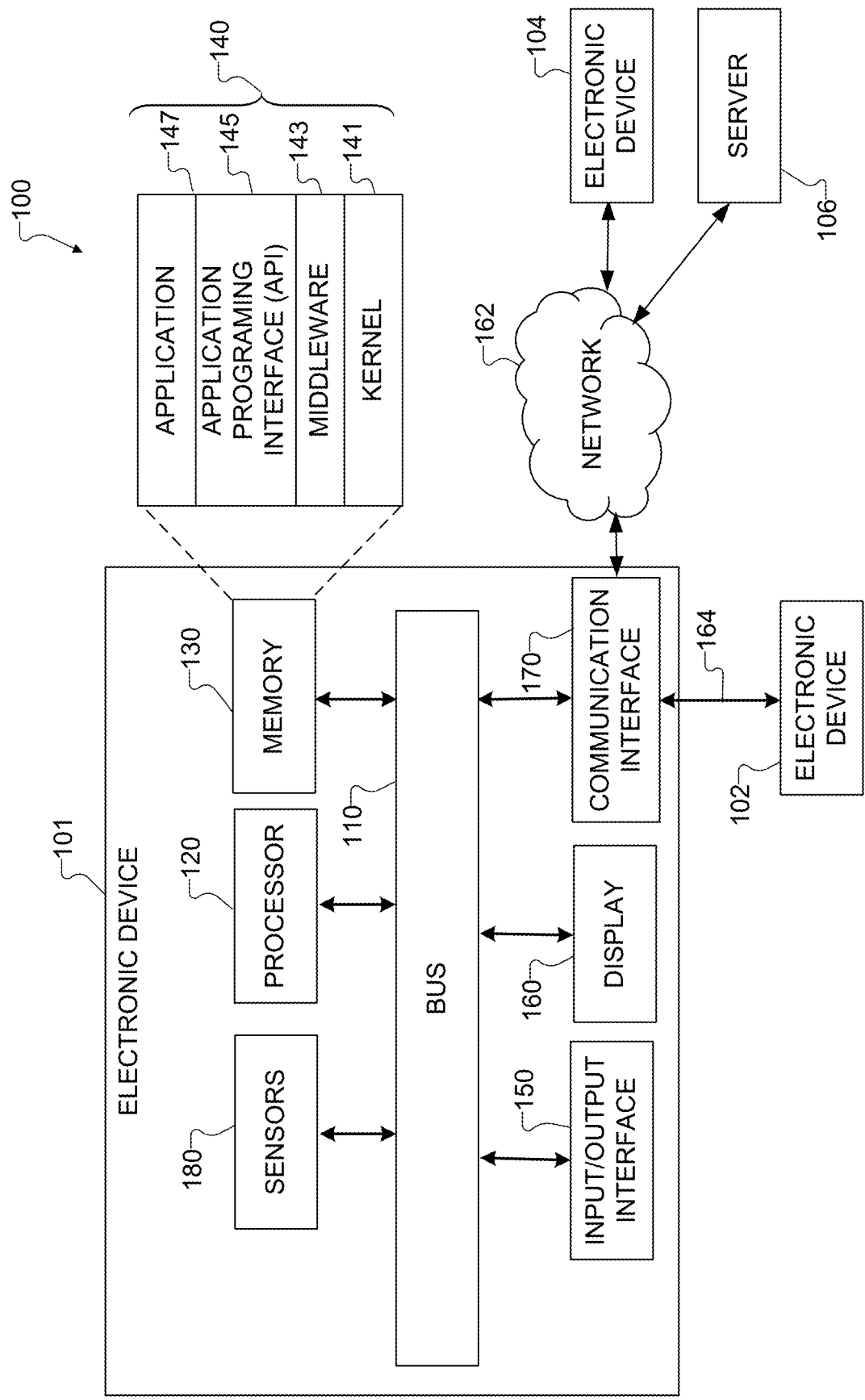
FIG. 1 illustrates an example network configuration including an electronic device according to embodiments of this disclosure.

FIGS. 1 through 10C, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, multi-frame blending algorithms are used in various applications to "fuse" or combine multiple image frames of a scene in order to produce a final image of the scene, such as in high dynamic range (HDR) imaging or motion blur reduction (MBR). In some applications, the image frames being fused are captured using different exposure settings, such as different ISO settings and/or different exposure times. Unfortunately, image frames captured using different exposure settings often have different brightness levels and often capture different amounts of motion within a scene. Global image histogram matching algorithms may be used to adjust one or more image frames in brightness in order to facilitate easier fusion of the image frames. However, global histogram matching algorithms can result in various image artifacts, such as brightness inconsistencies and color distortions. One problem with global image histogram matching is that it does not adapt to local image content, which can lead to a failure to find a reliable histogram match for certain types of image regions of a scene (such as the sky, trees, and a person's hair in image frames). As a result, it is typically difficult to fuse image frames that are captured using different exposure settings.

This disclosure provides various techniques for applying local histogram matching with global regularization and motion exclusion for multi-exposure image fusion. As described in more detail below, multiple image frames of a scene are captured using different exposure settings, such as when different image frames are captured using different exposure lengths. Pixels in the image frames associated with motion in the scene are excluded, and the image frames are divided into multiple sections or "tiles". In some cases, one image frame is identified as a reference image frame, and one or more other image frames are identified as one or more non-reference image frames and are each divided into tiles. A local histogram match map is calculated for each tile of the non-reference image frame, where the local histogram match map identifies how to adjust the image data from that tile so that its histogram more closely matches the histogram of image data in a corresponding tile of the reference image frame. One or more of the local histogram match maps may be regularized based on a global histogram match map for that image frame. For instance, part or all of a local histogram match map for an image tile can be replaced by part or all of the global histogram match map for the image frame containing that tile. The local histogram match maps can then be used to generate a final image of the scene.

By excluding pixels associated with motion in the captured image frames, the techniques described in this patent document help to reduce motion blur in the final image of the scene. Moreover, by using local histogram match maps, the techniques described in this patent document can more readily adapt to different types of local image content in the captured image frames. In addition, by regularizing the local histogram match maps based on the global histogram match map, certain specific types of local image content (such as over-exposed and under-exposed regions) in one or more image frames can be handled more effectively, significantly reducing image artifacts in those regions.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). For example, the processor 120 can receive image data and process the image data (as discussed in more detail below) to support multi-exposure image fusion using local histogram matching with global regularization and motion exclusion.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for image capture and image processing as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
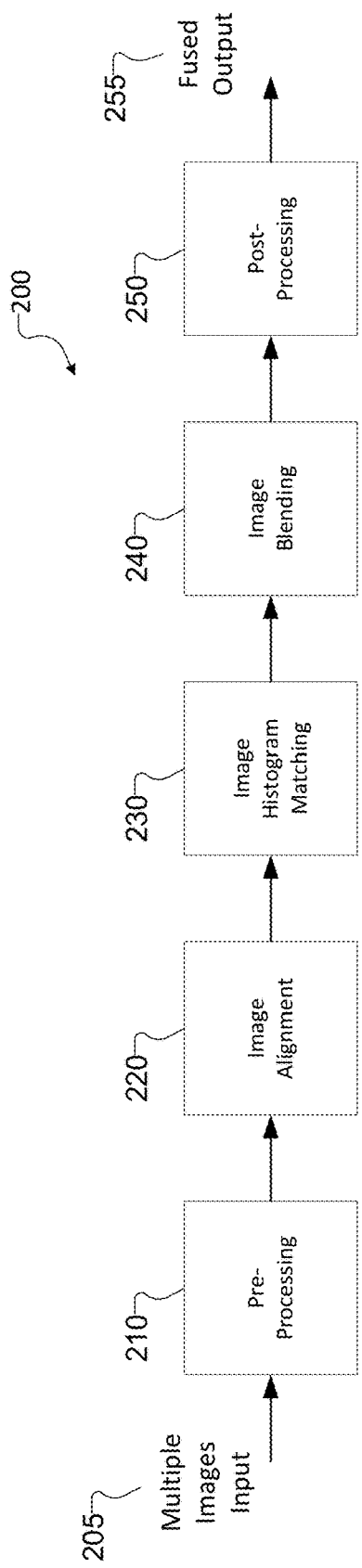
FIG. 2 illustrates an example process for multi-frame fusion according to embodiments of this disclosure.

FIG. 2 illustrates an example process 200 for multi-frame fusion according to embodiments of this disclosure. For ease of explanation, the process 200 shown in FIG. 2 is described as being performed using the electronic device 101 shown in FIG. 1. However, the process 200 shown in FIG. 2 could be used with any other suitable electronic device and in any suitable system.

In general, the process 200 is used to capture or otherwise obtain multiple image frames 205 of a scene and to process the image frames in order to generate a fused output image 255. Among other things, the fused output image 255 is produced by combining or fusing the image data contained in the image frames 205. At least two of the image frames 205 are captured using different exposure settings, such as different exposure lengths. In some embodiments, the process 200 may receive two image frames 205 captured using different exposure settings. In other embodiments, the process 200 may receive three or more image frames 205, where at least two of the image frames 205 are captured using different exposure settings.

Any suitable exposure settings may be used to capture the image frames 205. In some embodiments, at least one image frame 205 may be captured using an automatic exposure (referred to as an "auto-exposure") or other longer exposure, and at least one other image frame 205 may be captured using a shorter exposure relative to the automatic or longer exposure. An automatic exposure generally refers to an exposure that is automatically determined by a camera or other device, typically with little or no user input. In some cases, for example, a user is allowed to specify an exposure mode (such as portrait, landscape, sports, or other modes), and the automatic exposure can be generated based on the selected exposure mode without any other user input. Each exposure setting is typically associated with different settings for the camera, such as different apertures, shutter speeds, and camera sensor sensitivities. A shorter-exposure image frame is typically darker, lacks image details, and has more noise compared to an auto-exposure or other longer-exposure image frame. As a result, the shorter-exposure image frame may include one or more regions that are under-exposed, while the auto-exposure or other longer-exposure image frame may include one or more regions that are over-exposed. Note that while often described below as involving the use of at least one auto-exposure image frame and at least one shorter-exposure image frame, the techniques described in this patent document may be used with any suitable combination of image frames captured using different exposures.

In some instances, during a capture operation, the processor 120 can control the camera or other image sensor 180 of the electronic device 101 so that the image frames 205 are captured rapidly, such as in a burst mode. Alternatively, if the electronic device 101 includes multiple cameras or other image sensors 180, the image frames 205 may be captured simultaneously or in an overlapping manner. A capture request that triggers the capture of the image frames 205 represents any suitable command or input indicating a need or desire to capture an image of a scene using the electronic device 101. For example, the capture request could be initiated in response to a user's pressing of a "soft" button presented on the display 160 or the user's pressing of a "hard" button. In some instances described below, it may be assumed that two image frames 205 are captured in response to a capture request, although more than two image frames could be captured here.

During processing operations within the process 200, one image frame 205 can be used as a reference image frame, and the other image frame 205 can be used as a non-reference image frame. Depending on the circumstances, the reference image frame may represent the auto-exposure or other longer-exposure image frame, or the reference image frame may represent the shorter-exposure image frame. In some embodiments, the auto-exposure or other longer-exposure image frame may be used as the reference image frame by default, since this typically allows the image frame with greater image details to be used more when generating a composite or final image of a scene.

As shown in FIG. 2, a pre-processing operation 210 receives the image frames 205 and pre-processes the image frames 205 in a desired manner. Any suitable pre-processing functions may be performed here as part of the pre-processing operation 210. For example, the pre-processing operation 210 could perform a white balancing function to change or correct the color balance in one or more of the image frames 205. As another example, the pre-processing operation 210 could perform a function to reconstruct full color image frames from incomplete color samples contained in raw image frames using a mask (such as a CFA mask).

The pre-processed image frames 205 are provided to an image alignment operation 220, which generally operates to align the image frames 205 and produce aligned image frames. For example, the image alignment operation 220 may modify the non-reference image frame so that particular features in the non-reference image frame align with corresponding features in the reference image frame. Alignment may be needed to compensate for misalignment caused by the electronic device 101 moving or rotating in between image captures, which causes objects in the image frames 205 to move or rotate slightly (as is common with handheld devices). The image frames 205 can be aligned both geometrically and photometrically. In some embodiments, the image alignment operation 220 can use global Oriented FAST and Rotated BRIEF (ORB) features and local features from a block search to align the image frames, although other implementations of the image registration operation could also be used. Note that the reference image frame here may or may not be modified during the alignment, and the non-reference image frame could represent the only image frame that is modified during the alignment. As part of the image alignment operation 220, a coarse motion map is generated, where the coarse motion map reflects one or more areas in the aligned image frames where motion is present.

The aligned image frames 205 are provided to an image histogram matching operation 230, which generally operates to modify the non-reference image frame so that histograms of the non-reference image frame more closely match histograms of the reference image frame. Among other things, the image histogram matching operation 230 may operate to make the brightness level generally equal for both the reference and non-reference image frames and to match the colors in the reference and non-reference image frames more closely. The image histogram matching operation 230 outputs histogram-matched image frames. Note that the reference image frame here may or may not be modified during the histogram matching, and the non-reference image frame could represent the only image frame that is modified during the histogram matching. According to embodiments of this disclosure, local histogram matching can be performed by dividing the reference and non-reference image frames into tiles and performing histogram matching per tile. More details regarding the histogram matching operation 230 are described below in relation to FIG. 3.

The histogram-matched image frames are provided to an image blending operation 240, which blends or otherwise combines pixels from the image frames in order to produce at least one blended image of a scene. Each blended image generally represents a fusion of the image frames of different exposures, where each pixel in the blended image is extracted from either the reference or non-reference image frame or is a combination of pixels from both the reference and non-reference image frames. During the blending, the histogram-matched frames are used to provide accurate motion analysis and generate a motion map. This motion map is then used to guide the blending of image frames of different exposures. Various techniques may be used here to blend the image frames.

The at least one blended image is provided to a post-processing operation 250. The post-processing operation 250 can perform any suitable post-processing of the blended image to produce a fused output image 255. For example, the post-processing operation 250 could perform tone mapping or sharpening.

The various operations of the process 200 can be implemented in any suitable manner. For example, each of the operations of the process 200 can be implemented or supported using one or more software applications or other software instructions that are executed by at least one processor 120 of the electronic device 101. In other embodiments, at least some of the operations of the process 200 can be implemented or supported using dedicated hardware components. In general, the operations of the process 200 can be performed using any suitable hardware or any suitable combination of hardware and software/firmware instructions.

Although FIG. 2 illustrates one example of a process 200 for multi-frame fusion, various changes may be made to FIG. 2. For example, the electronic device 101 may perform any other desired functions as part of the process 200 or as part of a large image processing algorithm. As a particular example, the image frames 205 may undergo other suitable pre-processing and post-processing operations.

Figure 3:
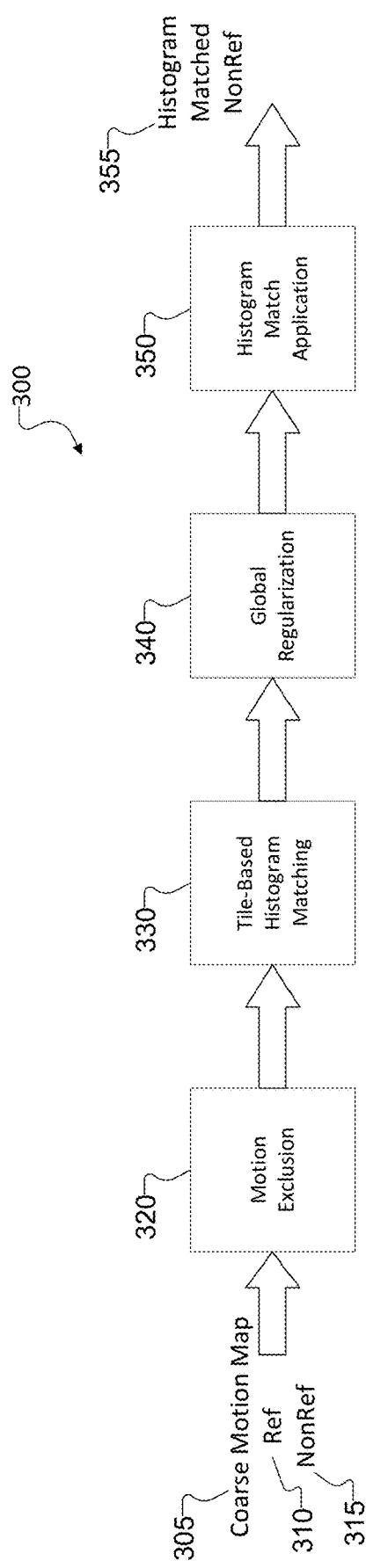
FIG. 3 illustrates an example process for performing image histogram matching in the process of FIG. 2 according to embodiments of this disclosure.

FIG. 3 illustrates an example process 300 for performing image histogram matching in the process 200 of FIG. 2 according to embodiments of this disclosure. In particular, the process 300 shown in FIG. 3 may be performed as part or all of the image histogram matching operation 230 in the process 200 shown in FIG. 2. For ease of explanation, the process 300 shown in FIG. 3 is described as being performed using the electronic device 101 shown in FIG. 1. However, the process 300 shown in FIG. 3 could be used with any other suitable electronic device and in any suitable system.

As shown in FIG. 3, the process 300 receives various inputs, such as a coarse motion map 305 and image frames 310 and 315, from the image alignment operation 220. The image frame 310 here represents a reference image frame, and the image frame 315 here represents a non-reference image frame. The image frames 310, 315 here have been pre-processed and aligned as described above. In some embodiments, the image frame 310 represents an auto-exposure or other longer-exposure image frame and the image frame 315 represents a shorter-exposure image frame, although that need not be the case. Also, while two image frames 310, 315 are received here, more than two image frames may be obtained.

The image frames 310 and 315 are provided to a motion exclusion operation 320, which generally operates to identify regions of one or more image frames 310 and 315 that contain motion based on the coarse motion map 305 and to exclude those regions from further processing. For example, the motion exclusion operation 320 may generate a mask containing values indicating whether motion is or is not detected in the image frames 310 and 315 based on the coarse motion map 305, and image data associated with motion areas in the image frames 310 and 315 can be excluded from further processing based on the mask. Alternatively, the image frames 310 and 315 can be modified by removing image data associated with motion.

The image frames 310 and 315 (or modified versions of the image frames 310 and 315) are provided to a tile-based histogram matching operation 330. According to embodiments of this disclosure, the image frames 310, 315 (or modified versions thereof) are divided into a number of tiles, and a local histogram match map is generated for each tile of the image frame 315. Each local histogram match map identifies how image data in the tile of the image frame 315 can be modified so that the image data's histogram more closely matches the histogram of a corresponding tile in the image frame 310. The tile-based histogram matching operation 330 can use any suitable technique to divide each image frame into tiles, and the tile-based histogram matching operation 330 can use any suitable technique to calculate a local histogram match map for the image data in each tile of an image frame. The tile-based histogram matching operation 330 can also calculate a global histogram match map for the image frame 315 in its entirety, and the tile-based histogram matching operation 330 can use any suitable technique to calculate a global histogram match map for the image data of an image frame.

A global regularization operation 340 receives the local and global histogram match maps. The global regularization operation 340 generally uses the global histogram match map for an image frame to optionally regularize one or more local histogram match maps for the tiles of that image frame. For example, part or all of a local histogram match map can be replaced by part or all of the global histogram match map in order to account for things like over-exposed and under-exposed regions, or interpolated values based at least partially on the global histogram match map can be determined and used in the local histogram match map. Depending on the scene being imaged, the global regularization operation 340 may modify one or more than one of the local histogram match maps for an image frame (or no local histogram match maps may be modified for particular image frames). This produces finalized local histogram match maps to be used to generate a final image of a scene.

A histogram matching operation 350 uses the finalized local histogram match maps (and possibly the global histogram match map) to modify one or more of the image frames 310, 315. In some embodiments, only the non-reference image frame 315 is modified, although both image frames 310, 315 could be modified in other embodiments. The histogram matching operation 350 can use any suitable technique to modify at least one image frame. One example of the types of operations that may be performed by the histogram matching operation 350 is provided below with reference to FIG. 8. At a minimum, the histogram matching operation 350 can output a histogram-matched non-reference image frame 355, which can be provided to the image blending operation 240. If the image frame 310 is modified, the histogram matching operation 350 can output multiple histogram-matched image frames.

The various operations of the process 300 can be implemented in any suitable manner. For example, each of the operations of the process 300 can be implemented or supported using one or more software applications or other software instructions that are executed by at least one processor 120 of the electronic device 101. In other embodiments, at least some of the operations of the process 300 can be implemented or supported using dedicated hardware components. In general, the operations of the process 300 can be performed using any suitable hardware or any suitable combination of hardware and software/firmware instructions.

Although FIG. 3 illustrates one example of a process 300 for performing image histogram matching in the process 200 of FIG. 2, various changes may be made to FIG. 3. For example, the electronic device 101 may perform any other desired functions as part of the process 300 or as part of a larger image processing algorithm.

Figure 4A:
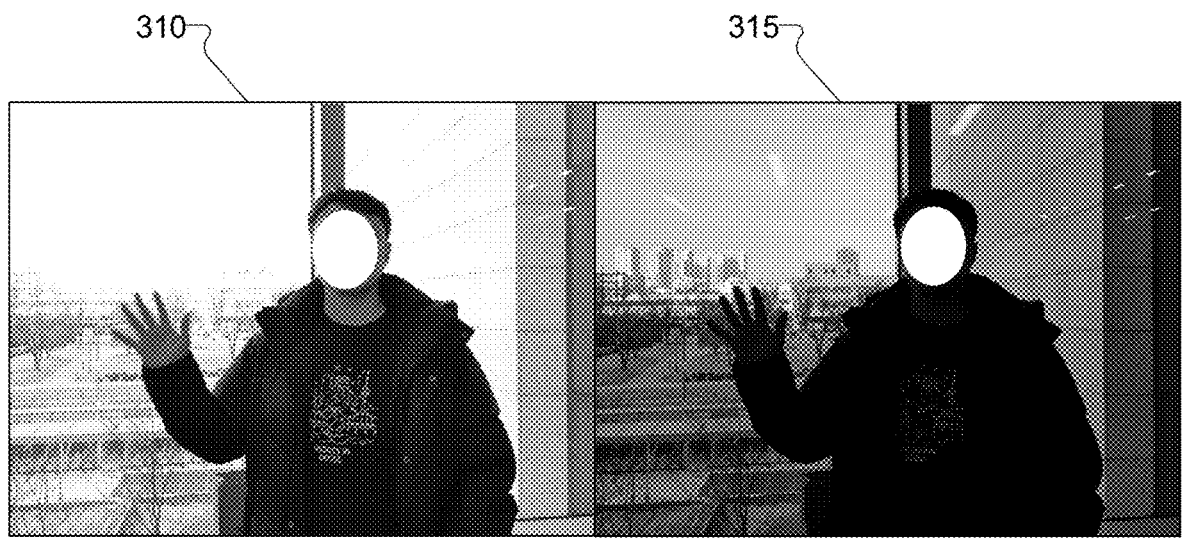
FIGS. 4A and 4B illustrate an example reference image frame, an example non-reference image frame, and an example coarse motion map according to embodiments of this disclosure.
Figure 4B:
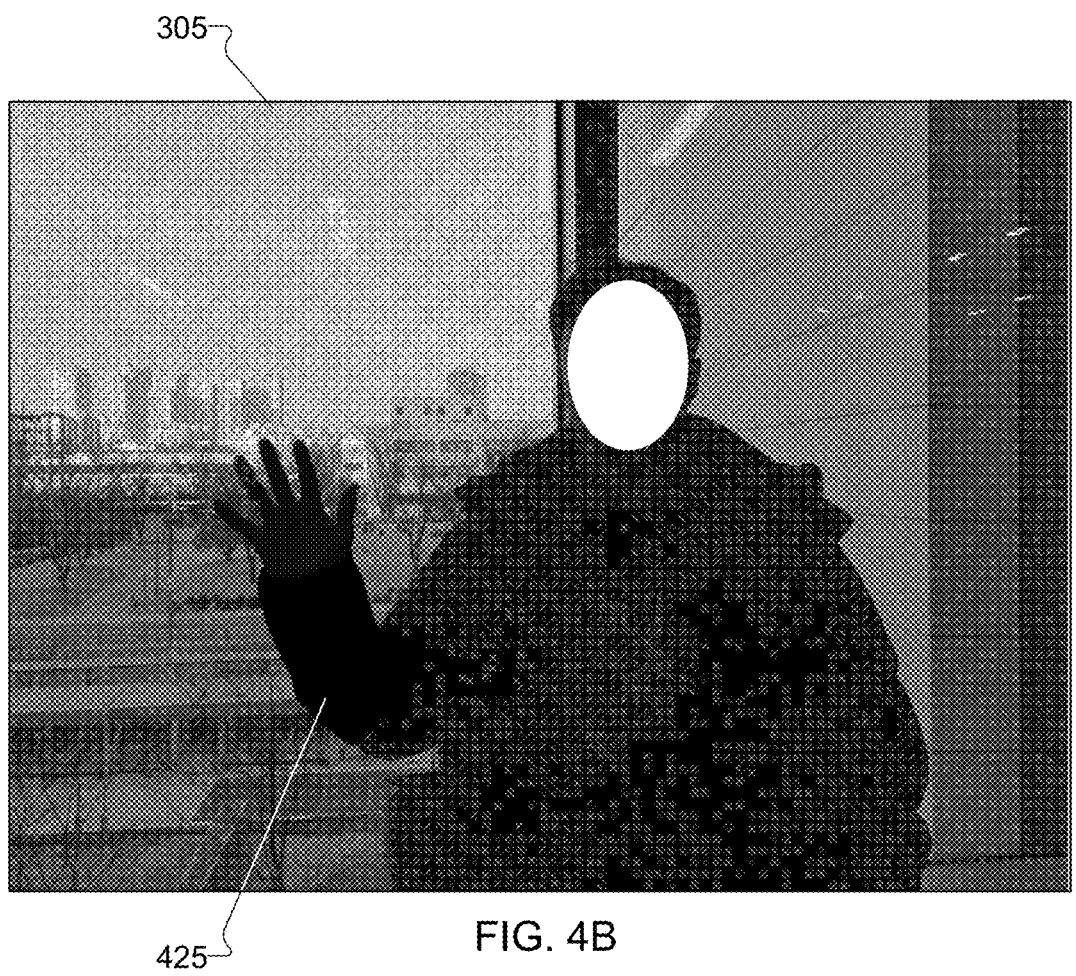

FIGS. 4A and 4B illustrate an example reference image frame 310, an example non-reference image frame 315, and an example coarse motion map 305 according to embodiments of this disclosure. In these images, a person's face has been obscured for privacy. As can be seen in FIG. 4A, the reference image frame 310 is captured using a longer exposure compared to the non-reference image frame 315. For example, the reference image frame 310 may be captured using an EV+0 exposure, and the non-reference image frame 315 may be captured using an EV−1, EV−2, or EV−3 exposure. As a result, the reference image frame 310 is brighter and contains more image details, but the reference image frame 310 suffers from greater motion blur or saturation. In contrast, the non-reference image frame 315 is darker and contains less image details, but the non-reference image frame 315 suffers from little or no motion blur or saturation.

As can be seen in FIG. 4B, the coarse motion map 305 identifies pixels associated with the image frame 310 or 315 in which motion is occurring. As described above, the coarse motion map 305 can be identified during the image alignment operation 220. As a result, the coarse motion map 305 may identify those areas of the image frames 310, 315 in which significant differences continue to exist between the image frames 310, 315 even after alignment. In this particular example, a person is waving his hand, and the pixels associated with a region 425 of an image containing the person's arm and hand shows significant motion (meaning motion above some threshold value). As a result, the pixels in the region 425 can be excluded from subsequent histogram matching operations, since significant motion easily leads to histogram mismatches between image frames.

Although FIGS. 4A and 4B illustrate one example of a reference image frame 310, a non-reference image frame 315, and a coarse motion map 305, various changes may be made to FIGS. 4A and 4B. For example, the image frames and motion map here are examples, and images of scenes and their associated coarse motion maps can vary widely.

Figure 5A:
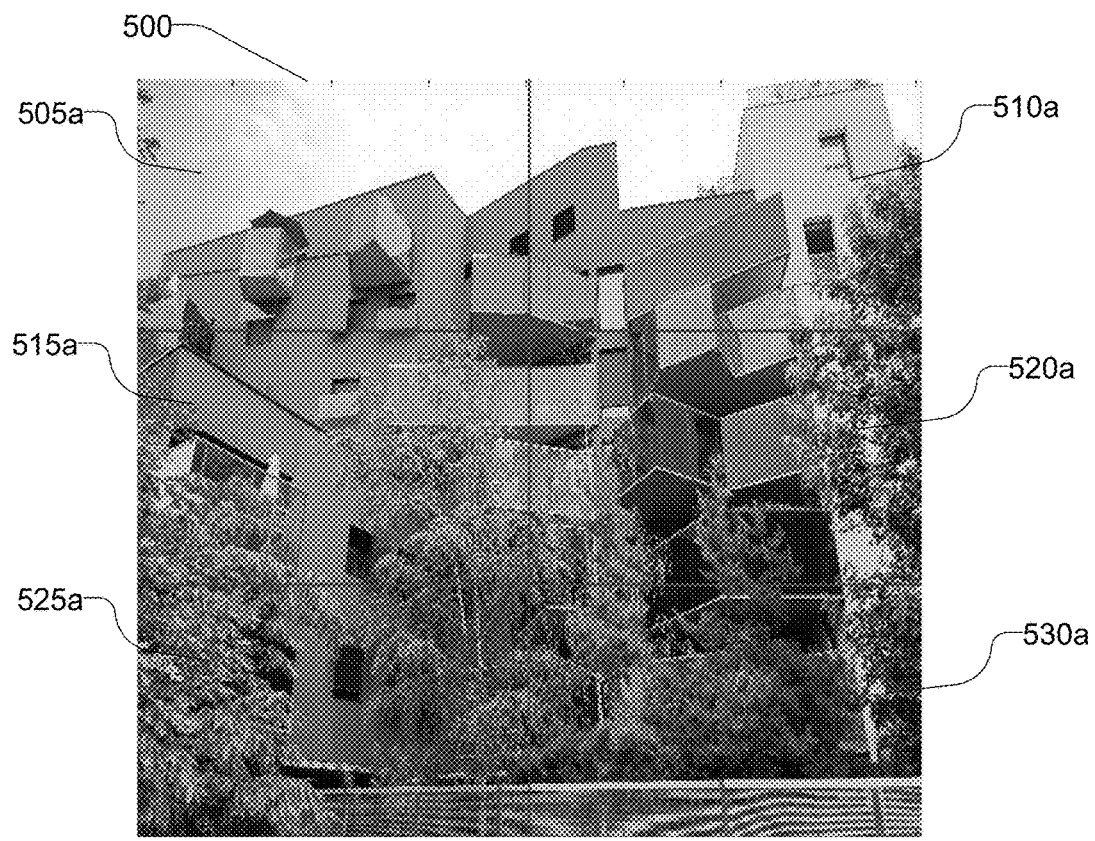
FIGS. 5A and 5B illustrate an example image frame divided into a number of tiles and local histogram match maps for the tiles as compared to a global histogram match map according to embodiments of this disclosure.
Figure 5B:
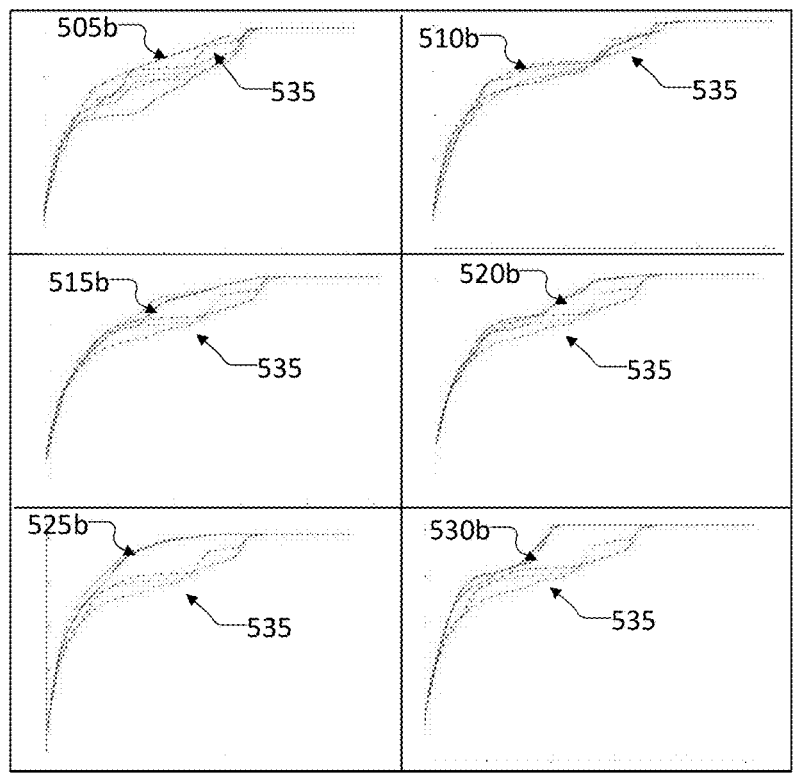

FIGS. 5A and 5B illustrate an example image frame 500 divided into a number of tiles 505a-530a and local histogram match maps 505b-530b for the tiles as compared to a global histogram match map 535 according to embodiments of this disclosure. As shown in FIG. 5A, the image frame 500 has been divided into a 2×3 array of tiles 505a-530a. Note that the number and arrangement of tiles 505a-530a here are for illustration only and that an image frame can be divided into any other suitable number and arrangement of tiles. Also, in this example, each of the tiles 505a-530a may generally encompass substantially the same amount of space in the image frame 500, although as described below this need not be the case. In some embodiments, the tile-based histogram matching operation 330 can divide different image frames into different numbers and arrangements of tiles based on various factors, such as the size of the image frames, the orientations of the image frames, and the contents of the image frames.

The tile-based histogram matching operation 330 calculates the local histogram match maps 505b-530b and the global histogram match map 535 for the image frame 500. Each local histogram match map 505b-530b is based on the image contents of a corresponding tile 505a-530a (as well as a corresponding tile of another image frame), and the global histogram match map 535 is based on the image contents of all tiles 505a-530a (as well as the other image frame). In this example, each local histogram match map 505b-530b is defined by solid lines in the associated graph, and the global histogram match map 535 is defined by dashed lines in the graphs. Multiple solid and dashed lines are shown in each graph, defining the curves for different color channels (such as curves for RGB channels). As explained in more detail below, the global histogram match map 535 can be used to modify or replace at least part of one or more local histogram match maps 505b-530b in various circumstances in order to improve the quality of the final image of a scene (a process referred to as regularization).

As noted above, histogram matching generally matches the brightness and color of the non-reference image frame 315 to the brightness and color of the reference image frame 310. This can be accomplished by calculating global and local histogram match maps for the non-reference image frame 315, regularizing any of the local histogram match maps based on the global histogram match map (if needed), and modifying the image data in at least the non-reference image frame 315 so that the modified image data has histograms that more closely match the histograms of the image data in the reference image frame 310. In some cases, only the image data in the non-reference image frame 315 may be modified in order to produce a histogram-matched non-reference image frame 355.

An image frame may be modified in any suitable manner based on a local histogram match map (or a regularized version thereof). For instance, a look-up table may map original luminance and/or chrominance pixel values from the non-reference image frame 315 into new luminance and/or chrominance pixel values for the histogram-matched non-reference image frame 355. The resulting histogram-matched non-reference image frame 355 ideally has a histogram that more closely matches a histogram of the reference image frame 310, helping to more closely match the brightness and color of the reference image frame 310.

The use of tile-based local histogram matching improves the overall quality of the histogram matching operation 230. That is, the histogram matching operation 230 is able to consider local image content in different regions of the image frame 500 and can more closely match those different regions to corresponding regions in another image frame. As illustrated in FIG. 5B, the curves for the global histogram match map 535 diverge from the curves for several of the local histogram match maps 505b-530b. Merely performing global histogram matching across all tiles 505a-530a would therefore likely lead to the creation of artifacts such as brightness inconsistencies and color distortions. Dividing image frames into tiles can better reflect the image content corresponding to the tiles, which in turn achieves better matching performance compared to global matching.

Although FIGS. 5A and 5B illustrate one example of an image frame 500 divided into a number of tiles 505a-530a and local histogram match maps 505b-530b for the tiles as compared to a global histogram match map 535, various changes may be made to FIGS. 5A and 5B. For example, the number of tiles used to divide an image frame may be increased or decreased, and the tiles need not have a uniform size or shape. As particular examples, an image frame may be divided into 3×3 tiles, 4×2 tiles, or 2×4 tiles, and different numbers and arrangements of tiles may be used with different resolutions (such as 3×3 tiles for 1440×1440 images or 2×4 or 4×2 tiles for 2288×1080 images).

Figure 6A:
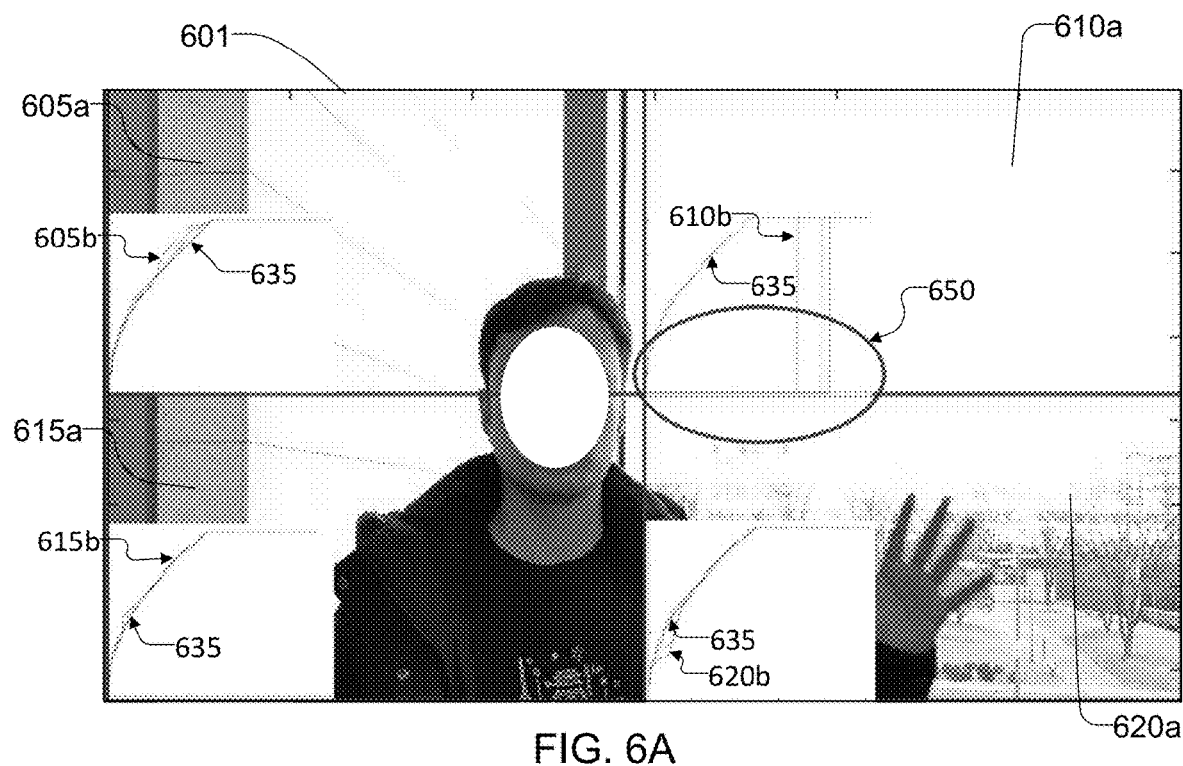
FIGS. 6A and 6B illustrate example local histogram match maps for an image frame with a large over-exposed region and an example histogram-matched image frame according to embodiments of this disclosure.
Figure 6B:

FIGS. 6A and 6B illustrate example local histogram match maps for an image frame 601 with a large over-exposed region and an example histogram-matched image frame 602 according to embodiments of this disclosure. As shown in FIG. 6A, the image frame 601 has been divided into tiles 605a-620a, and local histogram match maps 605b-620b have been generated for the respective tiles 605a-620a. Also, a global histogram match map 635 has been generated for the image 601, and the global histogram match map 635 has been plotted against each local histogram match map 605b-620b.

In this example, the local histogram match maps 605b, 615b, 620b follow the global histogram match map 635 relatively well. However, the local histogram match map 610b associated with the tile 610a does not. This is because the tile 610a corresponds to an area of high saturation in the image frame 601. As a result, as shown within an oval 650, the local histogram match map 610b includes RGB curves reflecting a zero value over much of the curves until the curves then jump to their maximum values. This is due to high saturation points in the image frame 601. Attempting to apply histogram matching using the local histogram match map 610b would therefore likely result in brightness or color mismatches in at least the tile 610a and possibly in neighboring tiles. To help compensate for this, the global regularization operation 340 can replace values in the local histogram match map 610b with values in the global histogram match map 635 (or values based on the global histogram match map 635) for use during subsequent histogram matching operations involving the tile 610a. The resulting image frame 602 produced in this manner is shown in FIG. 6B and can more accurately reflect the image data contained in the original image frame 601.

In some embodiments, this operation can be expressed as follows. To alleviate the problem presented by areas of high saturation in a non-reference image frame, a local histogram match map 610b is altered by a global regularization process that replaces zero values in the local histogram match map 610b with corresponding values from the global histogram match map 635. Also, for non-zero values in the local histogram match map 610b, the global regularization process can interpolate between the local and global curves to improve match performance. For example, the following function can be applied to the curves in the local histogram match map 610b, where w is a scaling weight calculated from the saturation amount in a tile:

$$f[k]=w*f_{global}[k]+(1-w)*f_{local}[k].$$

Although FIGS. 6A and 6B illustrate examples of local histogram match maps 605b-620b for an image frame 601 with a large over-exposed region and one example of a histogram-matched image frame 602, various changes may be made to FIGS. 6A and 6B. For example, these images are merely meant to illustrate how a local histogram match map for a saturated area of an image frame can be processed. Other image frames would have other image contents and histograms, but the same type of technique may be applied there.

Figure 7:
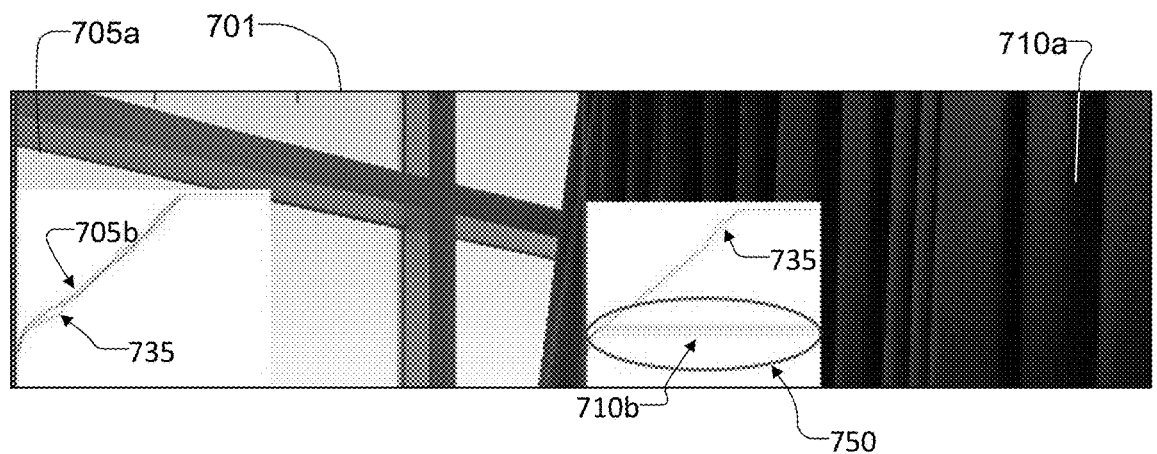
FIG. 7 illustrates example local histogram match maps for an image frame with a large under-exposed region according to embodiments of this disclosure.

FIG. 7 illustrates example local histogram match maps for an image frame 701 with a large under-exposed region according to embodiments of this disclosure. Similar to the problems presented by image frames with large over-exposed (over-saturated) regions, images with dark (under-exposed) regions also might not provide reliable local histogram match maps for use during histogram matching. Consider the example shown in FIG. 7, which shows the image frame 701 divided into tiles 705a-710a, local histogram match maps 705b-710b associated with respective tiles 705a-710a, and a global histogram match map 735 associated with all tiles 705a-710a.

In this example, the local histogram match map 705b follows the global histogram match map 735 relatively well. However, the local histogram match map 710b associated with the tile 710a does not. This is because the tile 710a corresponds to a dark region of the image frame 701. As a result, as shown within an oval 750, the local histogram match map 710b includes RGB curves that increase initially and then flatline at constant values over the bulk of the RGB curves. Attempting to apply histogram matching using the local histogram match map 710b would therefore likely result in brightness or color mismatches in at least the tile 710a and possibly in neighboring tiles. To help compensate for this, the global regularization operation 340 can replace the local histogram match map 710b with the global histogram match map 735 and use the global histogram match map 735 during subsequent histogram matching operations involving the tile 710a. The resulting image frame produced in this manner can more accurately reflect the image data contained in the original image frame 701.

In some embodiments, this operation can be expressed as follows. To alleviate the problem presented by a dark region in a non-reference image frame, a local histogram match map 710b is altered by a global regularization process similar to the process used for high saturated regions explained above with reference to FIGS. 6A and 6B. However, instead of replacing zero values in the local histogram match map 710*b* and interpolating non-zero values based on a saturation amount, the global regularization for dark regions may replace a local histogram match map's value with a corresponding global histogram match map's value if the difference between the two values exceeds a predetermined threshold. For example, the following function can be applied to the curves in the local histogram match map 710*b*, where T_th represents the threshold:

$$f[k]=f_{global}[k], \text{ if } |f_{local}[k_{max}]-f_{global}[k_{max}]|>T\_th.$$

Although FIG. 7 illustrates one example of local histogram match maps for an image frame 701 with a large under-exposed region, various changes may be made to FIG. 7. For example, this image is merely meant to illustrate how a local histogram match map for a darker area of an image frame can be processed. Other image frames would have other image contents and histograms, but the same type of technique may be applied there.

Figure 8:
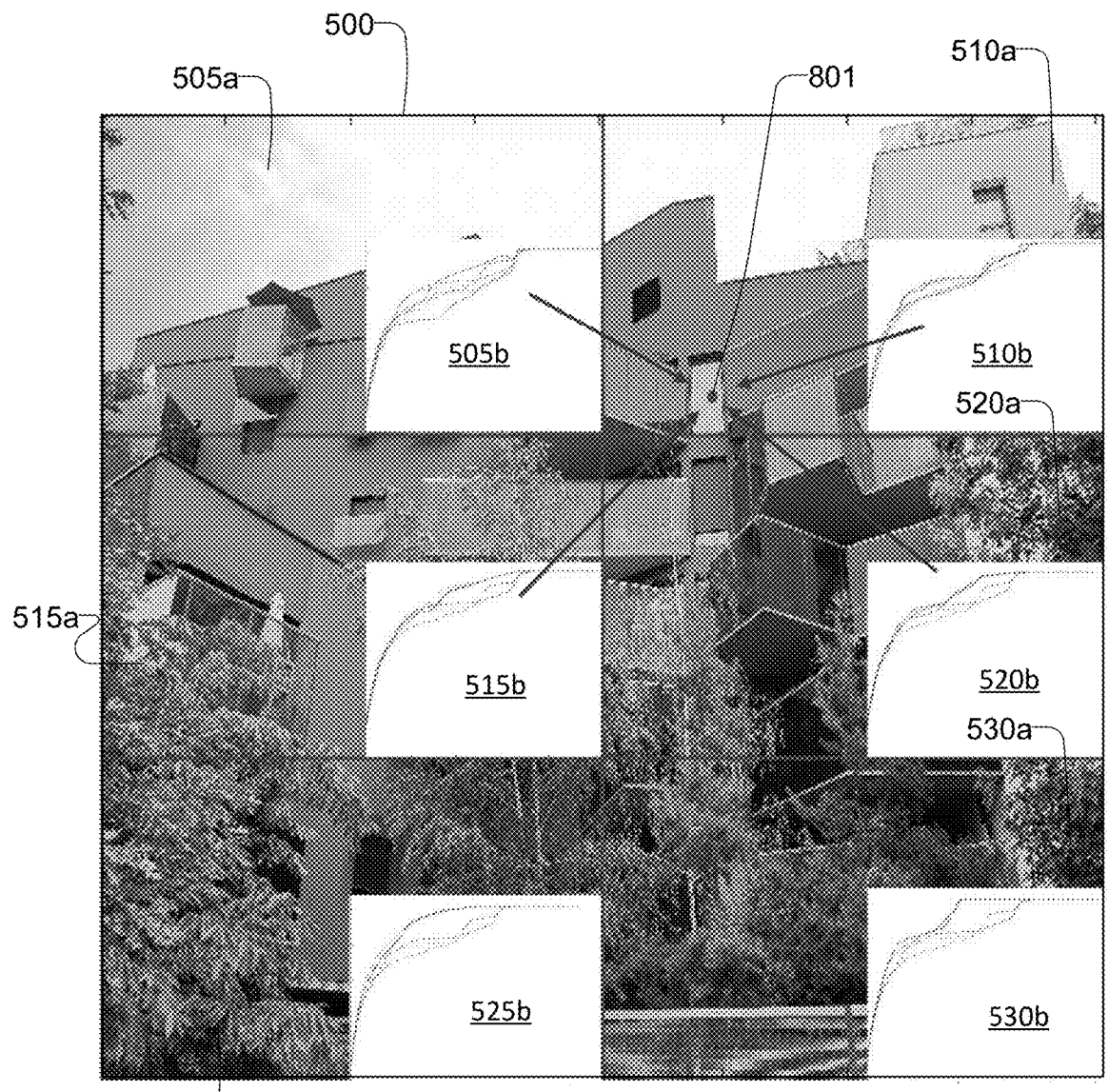
FIG. 8 illustrates an example application of local histogram matching according to embodiments of this disclosure.

FIG. 8 illustrates an example application of local histogram matching according to embodiments of this disclosure. The application shown in FIG. 8 may, for example, represent one way in which the histogram matching operation 350 described above may perform local histogram matching. Note, however, that the histogram matching operation 350 may perform any other suitable operations to provide local histogram matching.

As shown in FIG. 8, the image frame 500 and its tiles 505*a*-530*a* and local histogram match maps 505*b*-530*b* are being processed. To process the image frame 500, each pixel 801 of the image frame 500 is modified on a pixel-by-pixel basis. In some embodiments, this could be done merely by applying each local histogram match map 505*b*-530*b* to the pixel values of its corresponding tile 505*a*-530*a*.

In other embodiments, the value of each pixel 801 in a tile is interpolated based on multiple local histogram match maps of its nearest neighbors (such as its four nearest neighbors). This can help to provide smoothness in the histogram matching operation and avoid discontinuities around tile boundaries. As a particular example, the value of each pixel 801 in a tile may be interpolated based on weighted averaging of the pixel values as defined by the local histogram match maps of its nearest neighbors (such as its four nearest neighbors). For the specific pixel 801 shown in FIG. 8, the pixel 801 in the tile 810*a* can be based on values from the local histogram match maps 805*b*, 810*b*, 815*b*, and 820*b*. The weight applied to each value from a neighboring tile's local histogram match map can be based on the distance between the pixel 801 and the neighboring tile.

Although FIG. 8 illustrates one example of an application of local histogram matching, various changes may be made to FIG. 8. For example, local histogram match maps may be applied to pixel values of tiles in one or more image frames in any other suitable manner.

Figure 9:
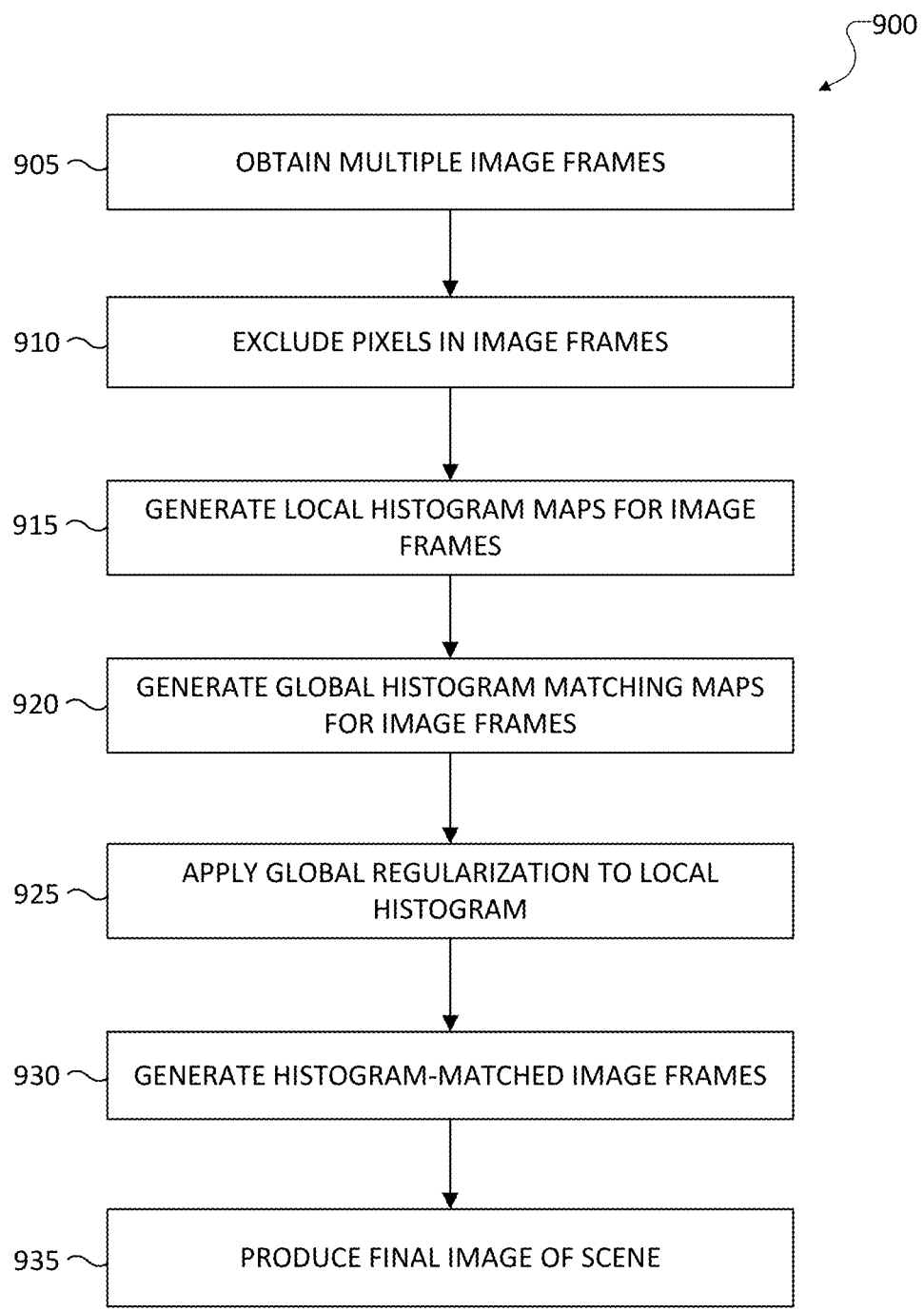
FIG. 9 illustrates an example method for multi-exposure image fusion using local histogram matching with global regularization and motion exclusion according to embodiments of this disclosure.

FIG. 9 illustrates an example method 900 for multi-exposure image fusion using local histogram matching with global regularization and motion exclusion according to embodiments of this disclosure. For ease of explanation, the method 900 shown in FIG. 9 is described as being performed using the electronic device 101 shown in FIG. 1. However, the method 900 shown in FIG. 9 could be used with any other suitable electronic device and in any suitable system.

In step 905, the electronic device 101 obtains multiple image frames 205 of a scene by using at least one sensor, such as one or more sensors 180 in FIG. 1. The multiple image frames 205 can include a reference image frame 310 captured using a longer exposure time and a non-reference image frame 315 captured using a shorter exposure time. The non-reference image frame 315 can appear underexposed when compared to the reference image frame 310.

In step 910, pixels are excluded from the multiple image frames based on a coarse motion map 305. The coarse motion map 305 can be generated during a pre-processing or alignment operation of a multi-frame fusion algorithm. The pixels to exclude correspond to at least one area in the multiple image frames 205 that contains a large amount of motion.

In step 915, multiple local histogram match maps are generated. For example, each of the image frames 205 can be divided into multiple tiles. A local histogram match map can then be generated based on a comparison of a tile in the reference image frame 310 and a corresponding tile in the non-reference image frame 315 (across all tiles of the image frames 310, 315). In step 920, a global histogram match map is generated. The global histogram match map can be generated based on a comparison of the entire reference image frame 310 and the entire non-reference image frame 315.

In step 925, global regularization may be applied to one or more of the local histogram match maps. For example, global regularization can be applied to a local histogram match map associated with a highly saturated region or a darker region of the non-reference image frame 315. Example approaches for replacing portions of a local histogram match map with (or based on) portions of a global histogram match map are provided above.

In step 930, histogram-matched image frames are generated and output. For example, a histogram-matched non-reference image frame 355 can be generated based on the local histogram match maps (at least one of which may have been regularized based on the global histogram match map). The resulting histogram-matched non-reference image frame 355 may closely match the reference image frame 310 in terms of brightness and color.

In step 935, a final image of a scene is produced. For example, a blending operation may occur. During the blending, the histogram-matched frames are used to provide an accurate motion analysis and generate a motion map. This motion map is used to guide the blending of the image frames 310 and 315. The resulting image may then undergo post-processing operations to produce a fused output image 255. The fused output image 255 may be stored, output, or used in any suitable manner. For instance, the fused output image 255 may be displayed on the display 160 of the electronic device 101, saved to a camera roll stored in a memory 130 of the electronic device 101, or attached to a text message, email, or other communication to be transmitted from the electronic device 101. Of course, the final image of the scene could be used in any other or additional manner.

Although FIG. 9 illustrates one example of a method 900 for multi-exposure image fusion using local histogram matching with global regularization and motion exclusion, various changes can be made to FIG. 9. For example, while shown as a series of steps, various steps in FIG. 9 could overlap, occur in parallel, occur in a different order, or occur any number of times.

It should be noted that while tiles in an image frame were shown and described above as being uniform with regular shapes and arrangements, other approaches for defining tiles in image frames may be used. For example, the tile-based histogram matching operation 330 can divide different image frames into different numbers and arrangements of tiles based on various factors, such as the size of the image frames, the orientations of the image frames, and the actual contents of the image frames.

Figure 10A:
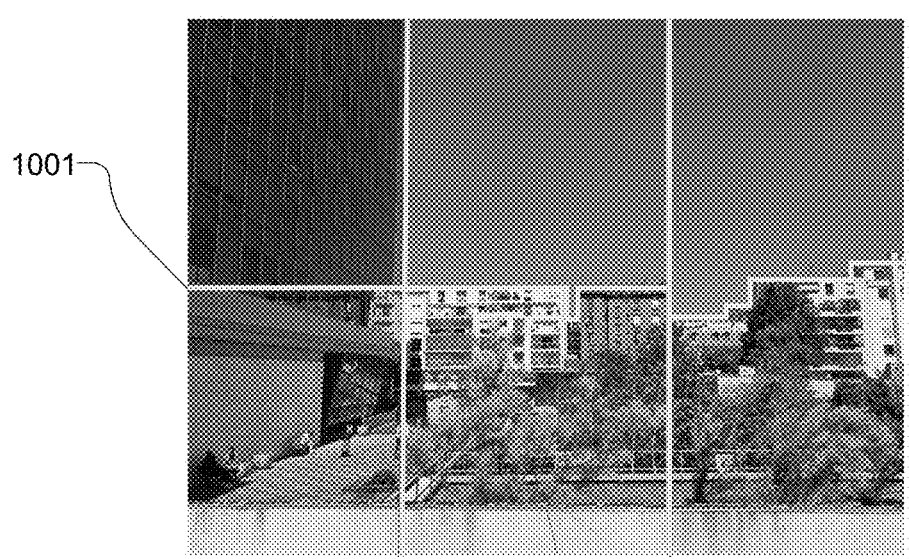
FIGS. 10A, 10B, and 10C illustrate examples of image frames divided into a number of irregular tiles according to embodiments of this disclosure.
Figure 10B:
Figure 10C:
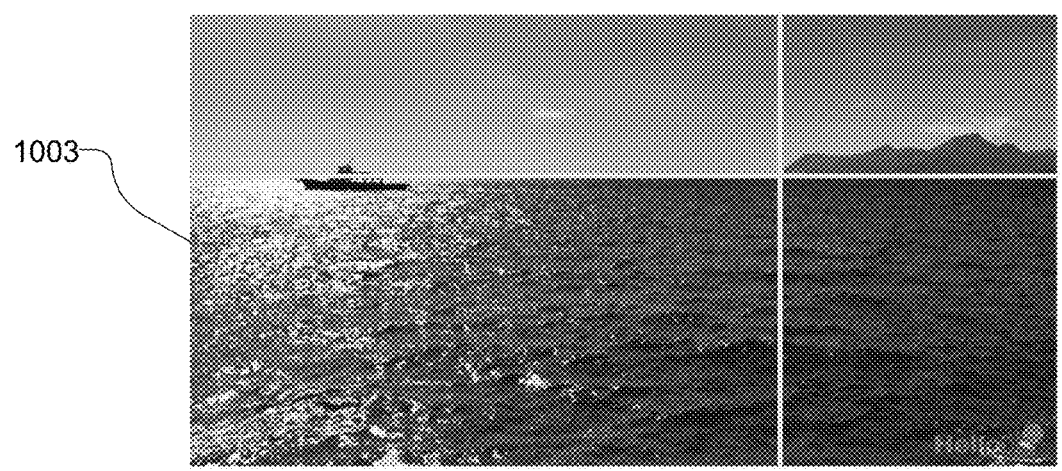

FIGS. 10A, 10B, and 10C illustrate examples of image frames 1001, 1002, 1003 divided into a number of irregular tiles according to embodiments of this disclosure. In FIG. 10A, the image frame 1001 includes tiles that are defined based on the presence of the sky detected in the image frame 1001, as well as based on the contours of one or more objects within the scene. Among other things, tiles are created to segment buildings into tiles separate from the sky. Note that tiles may be created to segment other objects in a scene from each other and from the sky.

In FIG. 10B, the image frame 1002 includes a tile that is defined around a person in a foreground of the scene, as well as one or more tiles defining a background of the scene. Note that one or more tiles may similarly be created around one or more objects in the foreground of a scene. Also note that, depending on the background of the scene, one or more tiles may similarly be created to encompass the background.

In FIG. 10C, the image frame 1003 includes tiles that are irregularly shaped based on features or objects in the image frame 1003. In this example, the tiles are defined by the skyline in a scene, which provides a natural break to partition upper and lower tiles. Similarly, mountains in the scene provide a natural break to partition left and right tiles.

In some embodiments, tiles for image frames can be identified by first performing a foreground/background segmentation process that identifies different regions in the foreground and background of a scene. Various approaches for foreground/background segmentation may be used here. For one or more background regions, the approaches described above can be used to perform local histogram matching for each background region in multiple image frames. During these operations, the foreground region(s) may be excluded from consideration. For one or more foreground regions, the approaches described above can also be used to perform local histogram matching for each foreground region in the multiple image frames. During those operations, the background region(s) may be excluded from consideration.

Among other things, this approach may further improve the histogram matching process, particularly in foreground regions. This can be beneficial for various scenes, such as when the foreground regions of image frames include the skin and hair of one or more people (which are often susceptible to color shifts and motion during image processing). This also still allows the background regions of the scene to be processed and obtain the benefits of local histogram matching.

Although FIGS. 10A, 10B, and 10C illustrate examples of image frames 1001, 1002, 1003 divided into tiles, various changes may be made to these figures. For example, these figures are merely meant to illustrate example ways in which an image frame can be segmented into tiles based on contents of the image frames. The number of tiles used to divide an image frame may be increased or decreased, and the arrangements of the tiles can vary as needed or desired.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
    obtaining, using at least one sensor of an electronic device, multiple image frames of a scene, the multiple image frames including a first image frame and a second image frame captured using different exposures;
    excluding, using at least one processor of the electronic device, pixels in the first and second image frames that are associated with at least a threshold amount of motion based on a coarse motion map;
    generating, using the at least one processor, multiple local histogram match maps based on different portions of the first and second image frames containing non-excluded pixels; and
    generating, using the at least one processor, an image of the scene using the local histogram match maps.

2. The method of claim 1, further comprising:
    generating a global histogram match map based on the first image frame and the second image frame; and
    modifying at least one of the local histogram match maps based on the global histogram match map.

3. The method of claim 2, wherein modifying at least one of the local histogram match maps comprises:
    replacing zero values in a specified local histogram match map with corresponding values from the global histogram match map; and
    replacing non-zero values in the specified local histogram match map with values interpolated between the specified local histogram match map and the global histogram match map.

4. The method of claim 3, wherein the values interpolated between the specified local histogram match map and the global histogram match map are weighted based on an amount of saturation in a corresponding tile of one of the multiple image frames.

5. The method of claim 2, wherein modifying at least one of the local histogram match maps comprises:
    replacing a value in a specified local histogram match map with a corresponding value from the global histogram match map when a difference between the value in the specified local histogram match map and the corresponding value from the global histogram match map exceeds a threshold.

6. The method of claim 1, wherein generating the image of the scene comprises:
    modifying the first image frame based on the local histogram match maps to produce a histogram-matched first image frame;
    generating a motion map based on the histogram-matched first image frame; and
    blending the first image frame and the second image frame using the motion map to produce the image of the scene.

7. The method of claim 1, further comprising:
    aligning the first and second image frames, wherein the coarse motion map is generated as part of the aligning of the first and second image frames.

8. An electronic device comprising:
    at least one image sensor; and
    at least one processor configured to:
        obtain multiple image frames of a scene from the at least one image sensor, the multiple image frames including a first image frame and a second image frame captured using different exposures;

exclude pixels in the first and second image frames that are associated with at least a threshold amount of motion based on a coarse motion map;

generate multiple local histogram match maps based on different portions of the first and second image frames containing non-excluded pixels; and generate an image of the scene using the local histogram match maps.

9. The electronic device of claim 8, wherein the at least one processor is further configured to:

generate a global histogram match map based on the first image frame and the second image frame; and modify at least one of the local histogram match maps based on the global histogram match map.

10. The electronic device of claim 9, wherein, to modify at least one of the local histogram match maps, the at least one processor is configured to:

replace zero values in a specified local histogram match map with corresponding values from the global histogram match map; and replace non-zero values in the specified local histogram match map with values interpolated between the specified local histogram match map and the global histogram match map.

11. The electronic device of claim 10, wherein the values interpolated between the specified local histogram match map and the global histogram match map are weighted based on an amount of saturation in a corresponding tile of one of the multiple image frames.

12. The electronic device of claim 9, wherein, to modify at least one of the local histogram match maps, the at least one processor is configured to:

replace a value in a specified local histogram match map with a corresponding value from the global histogram match map when a difference between the value in the specified local histogram match map and the corresponding value from the global histogram match map exceeds a threshold.

13. The electronic device of claim 8, wherein, to generate the image of the scene, the at least one processor is configured to:

modify the first image frame based on the local histogram match maps to produce a histogram-matched first image frame;

generate a motion map based on the histogram-matched first image frame; and blend the first image frame and the second image frame using the motion map to produce the image of the scene.

14. The electronic device of claim 8, wherein:

the at least one processor is further configured to align the first and second image frames; and the at least one processor is configured to generate the coarse motion map as part of the aligning of the first and second image frames.

15. A non-transitory machine-readable medium containing instructions that when executed cause at least one processor of an electronic device to:

obtain, using at least one sensor of the electronic device, multiple image frames of a scene, the multiple image frames including a first image frame and a second image frame captured using different exposures;

exclude pixels in the first and second image frames that are associated with at least a threshold amount of motion based on a coarse motion map;

generate multiple local histogram match maps based on different portions of the first and second image frames containing non-excluded pixels; and generate an image of the scene using the local histogram match maps.

16. The non-transitory machine-readable medium of claim 15, further containing instructions that when executed cause the at least one processor to:

generate a global histogram match map based on the first image frame and the second image frame; and modify at least one of the local histogram match maps based on the global histogram match map.

17. The non-transitory machine-readable medium of claim 16, wherein the instructions that when executed cause the at least one processor to modify at least one of the local histogram match maps comprise:

instructions that when executed cause the at least one processor to:

replace zero values in a specified local histogram match map with corresponding values from the global histogram match map; and replace non-zero values in the specified local histogram match map with values interpolated between the specified local histogram match map and the global histogram match map.

18. The non-transitory machine-readable medium of claim 17, wherein the values interpolated between the specified local histogram match map and the global histogram match map are weighted based on an amount of saturation in a corresponding tile of one of the multiple image frames.

19. The non-transitory machine-readable medium of claim 16, wherein the instructions that when executed cause the at least one processor to modify at least one of the local histogram match maps comprise:

instructions that when executed cause the at least one processor to replace a value in a specified local histogram match map with a corresponding value from the global histogram match map when a difference between the value in the specified local histogram match map and the corresponding value from the global histogram match map exceeds a threshold.

20. The non-transitory machine-readable medium of claim 15, wherein the instructions that when executed cause the at least one processor to generate the image of the scene comprise:

instructions that when executed cause the at least one processor to:

modify the first image frame based on the local histogram match maps to produce a histogram-matched first image frame;

generate a motion map based on the histogram-matched first image frame; and blend the first image frame and the second image frame using the motion map to produce the image of the scene.

21. The non-transitory machine-readable medium of claim 15, further containing instructions that when executed cause the at least one processor to align the first and second image frames;

wherein the coarse motion map is generated as part of the aligning of the first and second image frames.

* * * * *